United States Patent
Shiizaki et al.

(10) Patent No.: US 9,961,645 B2
(45) Date of Patent: May 1, 2018

(54) WIRELESS COMMUNICATION SYSTEM, BASE STATION DEVICE AND TRANSMISSION POWER CONTROL METHOD

(71) Applicant: FUJITSU LIMITED, Kawasaki-shi, Kanagawa (JP)

(72) Inventors: Kotaro Shiizaki, Kawasaki (JP); Junji Otonari, Kawasaki (JP); Nobukazu Fudaba, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/013,425

(22) Filed: Feb. 2, 2016

(65) Prior Publication Data
US 2016/0278024 A1 Sep. 22, 2016

(30) Foreign Application Priority Data
Mar. 17, 2015 (JP) .................. 2015-054006

(51) Int. Cl.
*H04M 1/00* (2006.01)
*H04W 52/24* (2009.01)
(Continued)

(52) U.S. Cl.
CPC ............. *H04W 52/24* (2013.01); *H04L 5/001* (2013.01); *H04L 5/0057* (2013.01);
(Continued)

(58) Field of Classification Search
CPC . H04W 52/24; H04W 52/343; H04W 54/362; H04L 5/001; H04L 5/0057
(Continued)

(56) References Cited

U.S. PATENT DOCUMENTS 6,567,459 B1 * 5/2003 Hakkinen ............. H04W 52/42
370/345
2004/0248581 A1 * 12/2004 Seki ....................... H04B 7/022
455/450

(Continued)

FOREIGN PATENT DOCUMENTS

| EP | 2485543 | 8/2012 |
|----|---------|--------|
| JP | 2006-135673 | 5/2006 |
| JP | 2013-507070 | 2/2013 |
| JP | 2013-240099 | 11/2013 |
| JP | 2014-022896 | 2/2014 |

*Primary Examiner* — Raj Chakraborty
(74) *Attorney, Agent, or Firm* — Fujitsu Patent Center

(57) ABSTRACT

A base station device includes: an acquisition unit that acquires reception quality of each of a plurality of carriers from a terminal device that performs primary cell connection for transmission and reception of a control channel signal using a carrier whose reception quality is most preferable; a decision unit that decides an amount of increase in transmission power of one of the carriers based on the reception quality acquired by the acquisition unit; a determination unit that estimates whether switching of the primary cell connection occurs in case of increasing the transmission power by the amount of increase and determines whether to increase the transmission power according to the estimation result; and an instruction unit that instructs a transmission unit to increase the transmission power of the carrier by the amount of increase when the determination unit determines to increase the transmission power.

8 Claims, 10 Drawing Sheets

(51) Int. Cl.
    *H04L 5/00*     (2006.01)
    *H04W 52/34*    (2009.01)
    *H04W 52/40*    (2009.01)
    *H04W 52/36*    (2009.01)
    *H04W 84/04*    (2009.01)

(52) U.S. Cl.
    CPC ....... *H04W 52/343* (2013.01); *H04W 52/362* (2013.01); *H04W 52/40* (2013.01); *H04W 52/241* (2013.01); *H04W 52/243* (2013.01); *H04W 52/246* (2013.01); *H04W 84/045* (2013.01)

(58) Field of Classification Search
    USPC ......................................................... 455/522
    See application file for complete search history.

(56)            References Cited

U.S. PATENT DOCUMENTS

| | | |
|---|---|---|
| 2006/0111137 A1 | 5/2006 | Mori et al. |
| 2011/0081936 A1 | 4/2011 | Haim et al. |
| 2011/0292824 A1* | 12/2011 | Uemura ................. H04W 56/00 370/252 |
| 2013/0136027 A1* | 5/2013 | Matsuo ................. H04W 24/10 370/252 |
| 2015/0173079 A1 | 6/2015 | Yokomakura et al. |
| 2016/0057715 A1* | 2/2016 | Wang ................... H04W 52/40 455/522 |

* cited by examiner

WIRELESS COMMUNICATION SYSTEM, BASE STATION DEVICE AND TRANSMISSION POWER CONTROL METHOD

CROSS-REFERENCE TO RELATED APPLICATION

This application is based upon and claims the benefit of priority of the prior Japanese Patent Application No. 2015-054006, filed on Mar. 17, 2015, the entire contents of which are incorporated herein by reference.

FIELD

The embodiment discussed herein is related to a wireless communication system, a base station device and a transmission power control method.

BACKGROUND

Recently, in a wireless communication system employing Long Term Evolution (LTE) or LTE-Advanced, services of which have already been provided by wireless communication enterprisers, there are cases where femtocells are formed in addition to macrocells of the related art. A femtocell is a cell having a relatively small radius and is formed in and out of a macrocell by locating a femto base station having relatively small transmission power.

As an operation method of wireless communication using the femtocell, a closed subscriber group (CSG) allows registered users to communicate through connection to the femtocell. Specifically, an operation method may be, for example, installing the femto base station in a household and allowing the household members or a user with an advanced permission to communicate via the femto base station. In a wireless communication system operated in such a CSG, handover between femtocells usually does not occur.

Meanwhile, in a wireless communication system employing LTE-Advanced, a technique called carrier aggregation (CA) may be employed. The carrier aggregation is to aggregate a plurality of component carriers (CCs) having different frequency bands for use in wireless communication between a terminal device and a base station device. For example, when the base station device communicates while assigning two component carriers to the terminal device, the terminal device makes a connection with a cell formed by one of the component carriers in primary cell (hereinafter referred to as "P cell") connection and makes a connection with a cell formed by the other component carrier in secondary cell (hereinafter referred to as "S cell") connection. Note that the component carrier used for P cell connection includes a control channel signal and the component carrier used for S cell connection does not include the control channel signal but a data channel signal. Therefore, the terminal device generally performs P cell connection by selecting the component carrier with preferable reception quality from among the plurality of component carriers.

Also, in the wireless communication system employing the carrier aggregation, the base station device forms a plurality of cells that corresponds to each of the plurality of component carriers. Therefore, the base station device is enabled to separately control transmission power of the cells corresponding to different component carriers and to change a cell radius of each component carrier.

[Patent Literature 1] Japanese Laid-open Patent Publication No. 2014-22896.

[Patent Literature 2] Japanese National Publication of International Patent Application No. 2013-507070.

Meanwhile, carrier aggregation may also be applied to communication between a femto base station and a terminal device. In this case, when a wireless communication system is operated by CSG, even the terminal device located in an edge of a cell is not handed over to another cell. That is, for example, even when the terminal device is located in the edge of the cell and reception quality of the component carrier used for communication is degraded, this terminal device is not handed over to an adjacent cell.

Therefore, to improve reception quality in the terminal device in the edge of the cell, transmission power of the component carrier used for communication by the terminal device may be increased to cause a radius of the cell covering the terminal device to be broadened.

However, there is an issue that increasing of transmission power of any of the component carriers results in increased number of terminal devices that make connection with that component carrier in P cell connection, thus resulting in temporary increase of load of the base station device. That is, increasing of transmission power of the component carrier in order to improve reception quality in the terminal device in the edge of the cell results in more preferable reception quality of the component carrier also in other terminal devices. Therefore, these other terminal devices perform P cell connection by selecting the component carrier with the more preferable reception quality and thus, temporarily, a number of cell switching occurs. As a result, processing load of the base station device increases due to that, for example, the base station device executes processing of remapping control channel signals, addressed to each of the terminal devices, to the component carrier used for P cell connection by each of the terminal devices.

Also, increasing of transmission power of the component carrier broadens the cell radius; however, this increases interference with an adjacent cell using the component carrier having the same frequency band.

The technology disclosed herein has been devised in consideration of the above circumstances with an object of providing a wireless communication system, a base station device, and a transmission power control method that are capable of suppressing a temporary increase of processing load.

SUMMARY

According to an aspect of an embodiment, a base station device includes an acquisition unit that acquires reception quality of each of a plurality of carriers from a terminal device that performs primary cell connection for transmission and reception of a control channel signal using a carrier whose reception quality is most preferable from among the plurality of carriers; a decision unit that decides an amount of increase in transmission power of one of the carriers based on the reception quality acquired by the acquisition unit; a determination unit that estimates whether switching of the primary cell connection occurs in case of increasing the transmission power by the amount of increase decided by the decision unit and determines whether to increase the transmission power according to the estimation result; and an instruction unit that instructs a transmission unit to increase the transmission power of the carrier by the amount of increase when the determination unit determines to increase the transmission power.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the present invention is not limited by the embodiments described herein.

[a] First Embodiment

Figure 1:
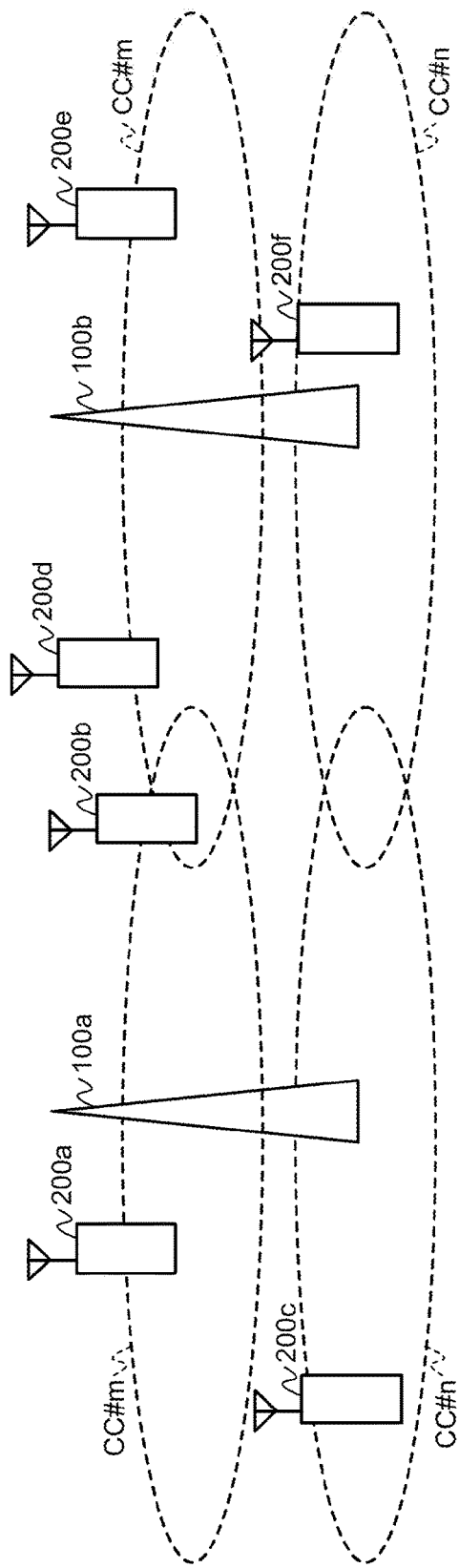
FIG. 1 is a diagram illustrating a configuration of a wireless communication system according to a first embodiment.

FIG. 1 is a diagram illustrating a configuration of a wireless communication system according to a first embodiment. The wireless communication system illustrated in FIG. 1 includes base station devices 100a and 100b and terminal devices 200a to 200f.

The base station devices 100a and 100b are femto base stations that form femtocells and separately communicate with a registered terminal device in a wireless manner. That is, the base station device 100a communicates wirelessly with the terminal devices 200a to 200c and the base station device 100b communicates wirelessly with the terminal devices 200d to 200f.

Moreover, the base station devices 100a and 100b perform wireless communication by carrier aggregation using component carriers CC#m and CC#n having different frequency bands. That is, each of the base station devices 100a and 100b forms a cell m corresponding to the component carrier CC#m and a cell n corresponding to the component carrier CC#n. For the terminal devices 200a to 200c, the cell m or cell n forms the P cell used for reception of a control channel signal.

The base station devices 100a and 100b are located adjacent to each other and perform carrier aggregation using the same component carriers CC#m and CC#n. Each of the base station devices 100a and 100b controls transmission power of the component carriers CC#m and CC#n separately to change a radius of the cell m and cell n. Transmission power control by the base station devices 100a and 100b will be described later in detail.

The terminal devices 200a to 200f are wireless communication terminals, such as a portable telephone or a smartphone, each communicating wirelessly with the base station device 100a or 100b that registers the present terminal device. Here, the terminal devices 200a to 200f perform P cell connection by selecting the cell corresponding to the component carrier with preferable reception quality from among the cells m and cells n formed by the base station devices 100a and 100b. That is, the terminal devices 200a to 200f cyclically measure reception quality of the component carriers CC#m and CC#n and select the component carrier with preferable reception quality as the component carrier for the control channel signal.

Specifically, the terminal devices 200a and 200b illustrated in FIG. 1 perform P cell connection with the base station device 100a using the component carrier CC#m and the terminal device 200c performs P cell connection with the base station device 100a using the component carrier CC#n. Also, the terminal devices 200d and 200e illustrated in FIG. 1 perform P cell connection with the base station device 100b using the component carrier CC#m and the terminal device 200f performs P cell connection with the base station device 100b using the component carrier CC#n. Among the terminal devices 200a to 200f, for example the terminal device 200b is located in an edge of the cell and thus reception quality of a signal from the base station device 100a is degraded. However, the terminal device 200b is not registered in the base station device 100b and thus is not handed over to the cell formed by the base station device 100b.

Figure 2:
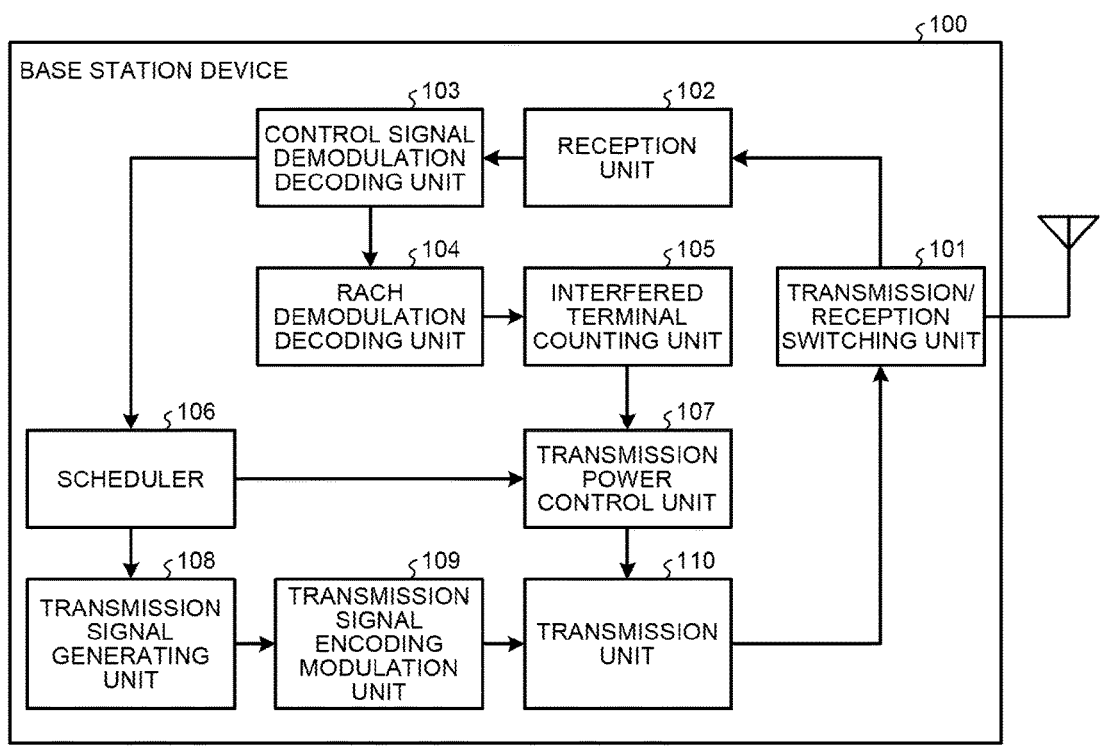
FIG. 2 is a block diagram illustrating a configuration of a base station device according to the first embodiment.

FIG. 2 is a block diagram illustrating a configuration of a base station device 100 according to the first embodiment. The base station device 100 is equivalent to the base station devices 100a and 100b illustrated in FIG. 1. The base station device 100 illustrated in FIG. 2 includes a transmission/reception switching unit 101, a reception unit 102, a control signal demodulation decoding unit 103, a random access channel (RACH) demodulation decoding unit 104, an interfered terminal counting unit 105, a scheduler 106, a transmission power control unit 107, a transmission signal generating unit 108, a transmission signal encoding modulation unit 109, and a transmission unit 110.

The transmission/reception switching unit 101 includes, for example a duplexer, and switches between transmission and reception of a signal via an antenna. The transmission/reception switching unit 101 outputs a reception signal to the reception unit 102 and transmits, via the antenna, a transmission signal output from the transmission unit 110.

Moreover, the reception unit 102 applies predetermined wireless reception processing such as analogue/digital (A/D) conversion to the reception signal output from the transmission/reception switching unit 101 and then outputs the reception signal obtained after the wireless reception processing to the control signal demodulation decoding unit 103.

The control signal demodulation decoding unit 103 demodulates and decodes the control channel signal (hereinafter referred to as "control signal") included in the reception signal and outputs an RACH signal for random access included in the control signal to the RACH demodulation decoding unit 104. Also, the control signal demodulation decoding unit 103 notifies the scheduler 106 of information, included in the control signal, on downlink reception quality measured and reported by the respective terminal devices.

The RACH demodulation decoding unit 104 demodulates and decodes the RACH signal output from the control signal demodulation decoding unit 103. Specifically, the RACH demodulation decoding unit 104 demodulates and decodes setting information for random access informed by other base station devices. That is, the base station device informs of setting information on a preamble randomly selected and transmitted by the terminal device such that the terminal device, requesting initiation of communication with the present base station device, is enabled for random access. The base station device 100 thus periodically receives the setting information informed by other base station devices and the RACH demodulation decoding unit 104 demodulates and decodes this setting information.

The RACH demodulation decoding unit 104, using the setting information demodulated and decoded, further demodulates and decodes the preamble for random access transmitted to other base station devices from the terminal device. That is, the terminal device transmits the preamble randomly selected and requests resource assignment to the base station device as a potential communication counterpart when requesting initiation of communication therewith while the RACH demodulation decoding unit 104 demodulates and decodes the preamble addressed to other base station devices. Therefore, the number of preambles demodulated and decoded by the RACH demodulation decoding unit 104 is equal to the number of terminal devices that communicates with the base station devices other than the base station device 100.

Note that the RACH demodulation decoding unit 104 does not necessarily demodulate and decode the setting information informed by other base station devices. That is, the base station device 100 does not necessarily receive the setting information informed by other base station devices. Demodulating and decoding the setting information allows the RACH demodulation decoding unit 104 to distinguish a preamble addressed to base station devices adjacent to the base station device 100 and a preamble addressed to other base station devices upon demodulation and decoding. However, even when the setting information is not demodulated and decoded, the RACH demodulation decoding unit 104 may demodulate and decode the preamble addressed to base station devices other than the base station device 100 without distinguishing the preamble addressed to adjacent base station devices and the preamble addressed to other base station devices.

The interfered terminal counting unit 105 counts the number of terminal devices (hereinafter referred to as "interfered terminal") subjected to increased interference when transmission power from the base station device 100 increases. Specifically, the interfered terminal counting unit 105 counts, from among the preambles demodulated and decoded by the RACH demodulation decoding unit 104, the number of preambles transmitted to the adjacent base station devices using the same component carrier as that of the base station device 100.

For example, when the adjacent base station devices use the same component carriers CC#m and CC#n as those of the base station device 100, the interfered terminal counting unit 105 counts the number of preambles transmitted to the adjacent base station devices for each of the component carriers. That is, the interfered terminal counting unit 105 counts the number of preambles transmitted to the adjacent base station devices using the component carrier CC#m and the number of preambles transmitted to the adjacent base station devices using the component carrier CC#n. Since the terminal device transmitting the preamble to the adjacent base station devices has a potential to be an interfered terminal, the interfered terminal counting unit 105 counts the number of interfered terminals for each component carrier by counting the number of preambles.

Note that, as described above, when the RACH demodulation decoding unit 104 does not demodulate and decode the setting information, the preamble addressed to the adjacent base station devices and the preamble addressed to other base station devices are not distinguished. In this case, the interfered terminal counting unit 105 may count, for each component carrier, the number of preambles transmitted to the base station devices other than the base station device 100. This is because the terminal device within an area where the base station device 100 can receive an preamble therefrom has a great potential to be an interfered terminal that is affected by interference due to increased transmission power from the base station device 100 regardless of whether a communication counterpart of the terminal device is the adjacent base station device.

The scheduler 106 executes a scheduling of transmission to the respective terminal devices based on information on the downlink reception quality reported by the respective terminal devices. Specifically, the scheduler 106 determines assignment of wireless resources to the terminal devices based on the reception quality in the respective terminal devices and notifies the assignment to the transmission signal generating unit 108. Furthermore, the scheduler 106 determines an encoding rate or modulation method corresponding to reception quality in the respective terminal devices and notifies the encoding rate or modulation method to the transmission signal generating unit 108.

While executing such a scheduling, the scheduler 106 notifies the transmission power control unit 107 of the reception quality in the respective terminal devices for each component carrier. That is, for example, when the base station device 100 uses the component carriers CC#m and CC#n, the scheduler 106 notifies the transmission power control unit 107 of reception quality of the component carrier CC#m and reception quality of the component carrier CC#n reported by the respective terminal devices.

The transmission power control unit 107 controls transmission power of the base station device 100 for each component carrier. Here, the transmission power control unit 107 refers to the reception quality in the respective terminal devices and determines whether there is a terminal device (hereinafter referred to as "low-quality terminal") reception quality which is lower than a predetermined quality threshold. When there is the low-quality terminal, the transmission power control unit 107 increases transmission power of the component carrier with low reception quality. Here, however, the transmission power control unit 107 refers to the number of interfered terminals counted by the interfered terminal counting unit 105. When the number of interfered terminals is lower than a predetermined threshold, the transmission power control unit 107 increases transmission power. Furthermore, the transmission power control unit 107 determines an amount of increase in transmission power such that occurrence of switching P cell connection by the terminal device is suppressed. Transmission power control by the transmission power control unit 107 will be described later in detail.

The transmission signal generating unit 108 generates a transmission signal addressed to the respective terminal devices according to the assignment of wireless resources by the scheduler 106. The transmission signal generating unit 108 then outputs the generated transmission signal to the transmission signal encoding modulation unit 109 and notifies the encoding rate and modulation method, of the respective terminal devices, determined by the scheduler 106, to the transmission signal encoding modulation unit 109.

The transmission signal encoding modulation unit 109 encodes and modulates the transmission signal output from the transmission signal generating unit 108. Here, the transmission signal encoding modulation unit 109 encodes and modulates the transmission signal addressed to the respective terminal devices with the encoding rate and modulation method notified by the transmission signal generating unit 108.

The transmission unit 110 performs predetermined wireless transmission processing such as digital/analogue (D/A) conversion, sets transmission power for the transmission signal at transmission power controlled by the transmission power control unit 107, and outputs the transmission signal obtained after the wireless transmission processing to the transmission/reception switching unit 101.

Figure 3:
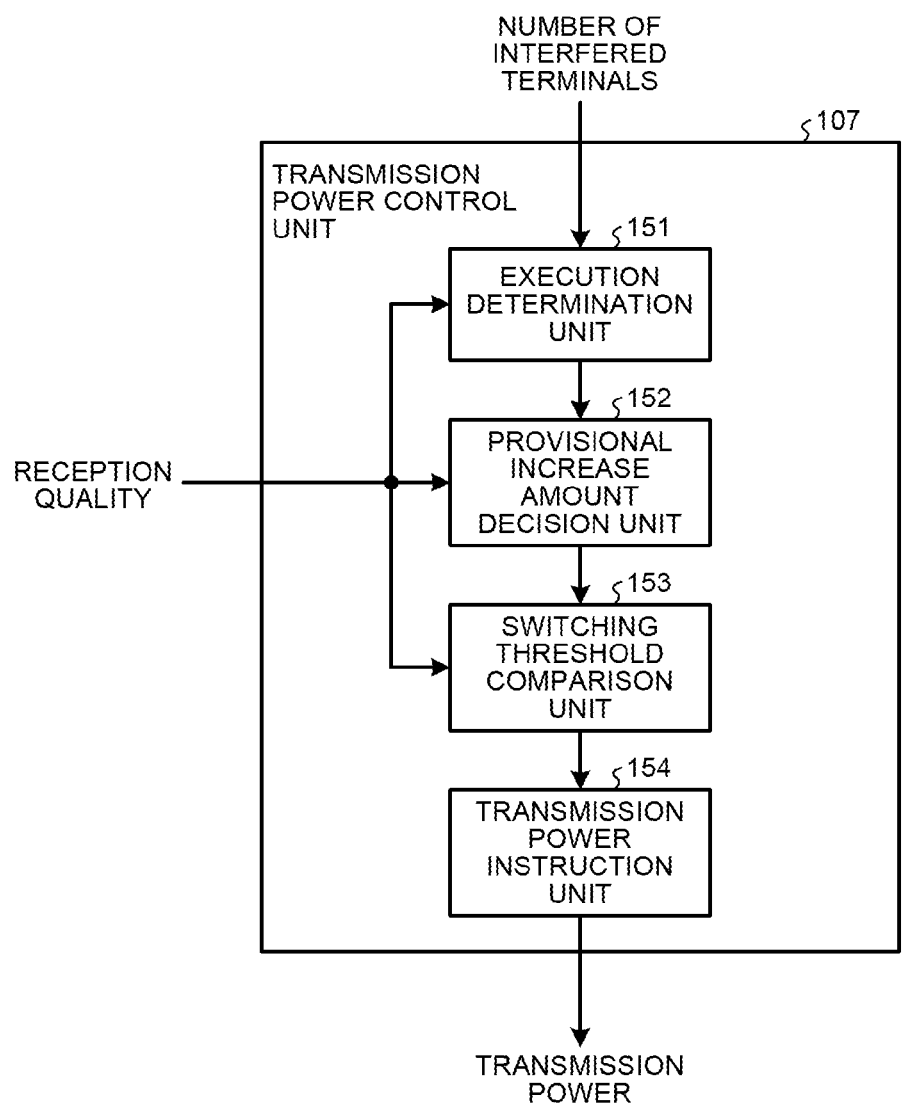
FIG. 3 is a block diagram illustrating a configuration of a transmission power control unit according to the first embodiment.

FIG. 3 is a block diagram illustrating a configuration of the transmission power control unit 107 according to the first embodiment. The transmission power control unit 107 illustrated in FIG. 3 includes an execution determination unit 151, a provisional increase amount decision unit 152, a switching threshold comparison unit 153, and a transmission power instruction unit 154.

The execution determination unit 151 determines whether to execute transmission power increase based on the reception quality in the respective terminal devices having been notified by the scheduler 106 and the number of interfered terminals having been counted by the interfered terminal counting unit 105. Specifically, the execution determination unit 151 refers to the reception quality in the respective terminal devices for each component carrier and determines whether there is a low-quality terminal reception quality which is lower than the predetermined quality threshold. When there is such a low-quality terminal, the execution determination unit 151 acquires the number of interfered terminals corresponding to the component carrier, reception quality of which is degraded in the low-quality terminal, from the interfered terminal counting unit 105. When the acquired number of interfered terminals is lower than a predetermined number, the execution determination unit 151 determines execution of transmission power increase.

On the other hand, when there is no low-quality terminal or when the number of interfered terminals is greater than or equal to the predetermined number even when there is a low-quality terminal, the execution determination unit 151 determines not to execute transmission power increase. When the execution determination unit 151 determines to execute transmission power increase, the execution determination unit 151 notifies as such to the provisional increase amount decision unit 152.

The provisional increase amount decision unit 152 decides a provisional amount of increase in transmission power when notified of execution of transmission power increase by the execution determination unit 151. Specifically, the provisional increase amount decision unit 152 decides, as the provisional amount of increase, such an amount of increase in transmission power that reception quality in the low-quality terminal having the lowest reception quality is greater than or equal to the predetermined quality threshold. Alternatively, the provisional increase amount decision unit 152 may decide, as the provisional amount of increase, such an amount of increase in transmission power that an average reception quality in all the low-quality terminals is greater than or equal to the predetermined quality threshold.

The switching threshold comparison unit 153 calculates a difference in reception quality between component carriers in case of increasing transmission power by the provisional amount of increase and compares the calculated difference and a predetermined switching threshold. The switching threshold corresponds to a difference in reception quality between component carriers when the terminal device switches P cell connection. That is, the terminal device performs P cell connection with another cell when reception quality in the other cell is greater than reception quality in the cell with which the terminal device currently makes connection in P cell connection by the switching threshold or more.

Thus, the switching threshold comparison unit 153 determines whether an average reception quality of a component carrier is greater than an average reception quality of another component carrier by the switching threshold or more when transmission power of the component carrier is increased by the provisional amount of increase. In other words, the switching threshold comparison unit 153 determines whether the difference in reception quality between cells (hereinafter referred to as "inter-cell gap") corresponding to each component carrier becomes greater than or equal to the switching threshold due to increasing of transmission power.

When the switching threshold comparison unit 153 determines that the inter-cell gap is greater than or equal to the switching threshold, the switching threshold comparison unit 153 halts increasing of transmission power since it is estimated that the terminal device switches P cell connection. Here, the switching threshold comparison unit 153 may, without completely halting increasing of transmission power, set the amount of increase in transmission power lower than the provisional amount of increase such that the inter-cell gap is lower than the switching threshold. On the other hand, when the switching threshold comparison unit 153 determines that the inter-cell gap is lower than the switching threshold, the switching threshold comparison unit 153 determines the provisional amount of increase as the amount of increase in transmission power and notifies as such to the transmission power instruction unit 154.

The transmission power instruction unit 154 instructs the transmission unit 110 to increase transmission power by the amount of increase in transmission power notified from the switching threshold comparison unit 153.

Figure 4:
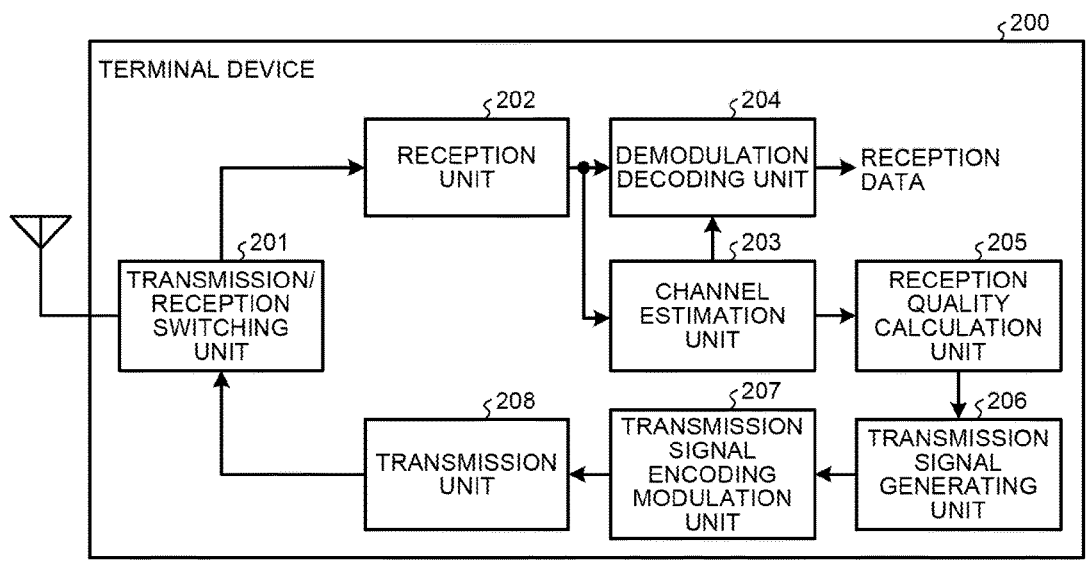
FIG. 4 is a block diagram illustrating a configuration of a terminal device according to the first embodiment.

Next, a configuration of the terminal device according to the first embodiment will be described. FIG. 4 is a block diagram illustrating a configuration of a terminal device 200 according to the first embodiment. The terminal device 200 is equivalent to the terminal devices 200*a* to 200*f* illustrated in FIG. 1. The terminal device 200 illustrated in FIG. 4 includes a transmission/reception switching unit 201, a reception unit 202, a channel estimation unit 203, a demodulation decoding unit 204, a reception quality calculation unit 205, a transmission signal generating unit 206, a transmission signal encoding modulation unit 207, and a transmission unit 208.

The transmission/reception switching unit 201 includes, for example a duplexer, and switches between transmission and reception of a signal via an antenna. The transmission/reception switching unit 201 outputs a reception signal to the reception unit 202 and transmits, via the antenna, a transmission signal output from the transmission unit 208.

The reception unit 202 applies predetermined wireless reception processing such as A/D conversion to the reception signal output from the transmission/reception switching unit 201 and then outputs the reception signal obtained after the wireless reception processing to the channel estimation unit 203 and demodulation decoding unit 204.

The channel estimation unit 203 executes downlink channel estimation using a known reference signal included in the reception signal.

The demodulation decoding unit 204 demodulates and decodes the reception signal using the channel estimation result from the channel estimation unit 203 and outputs reception data.

The reception quality calculation unit 205 calculates downlink reception quality based on the channel estimation result from the channel estimation unit 203. Specifically, the reception quality calculation unit 205 calculates, for example, a signal to interference plus noise ratio (SINR) for each component carrier. The reception quality calculation unit 205 further periodically compares SINR for each component carrier, selects the component carrier with the most preferable reception quality, and instructs the reception unit 202 and transmission unit 208 to perform P cell connection.

The transmission signal generating unit 206 generates a transmission signal, addressed to the base station device, including a control signal reporting on the reception quality calculated by the reception quality calculation unit 205. Here, the transmission signal generating unit 206 generates the transmission signal that allows transmission of the control signal by the component carrier used for P cell connection.

The transmission signal encoding modulation unit 207 encodes and modulates the transmission signal output from the transmission signal generating unit 206.

The transmission unit 208 applies predetermined wireless transmission processing such as D/A conversion to the transmission signal and then outputs the transmission signal obtained after the wireless transmission processing to the transmission/reception switching unit 201.

Figure 5:
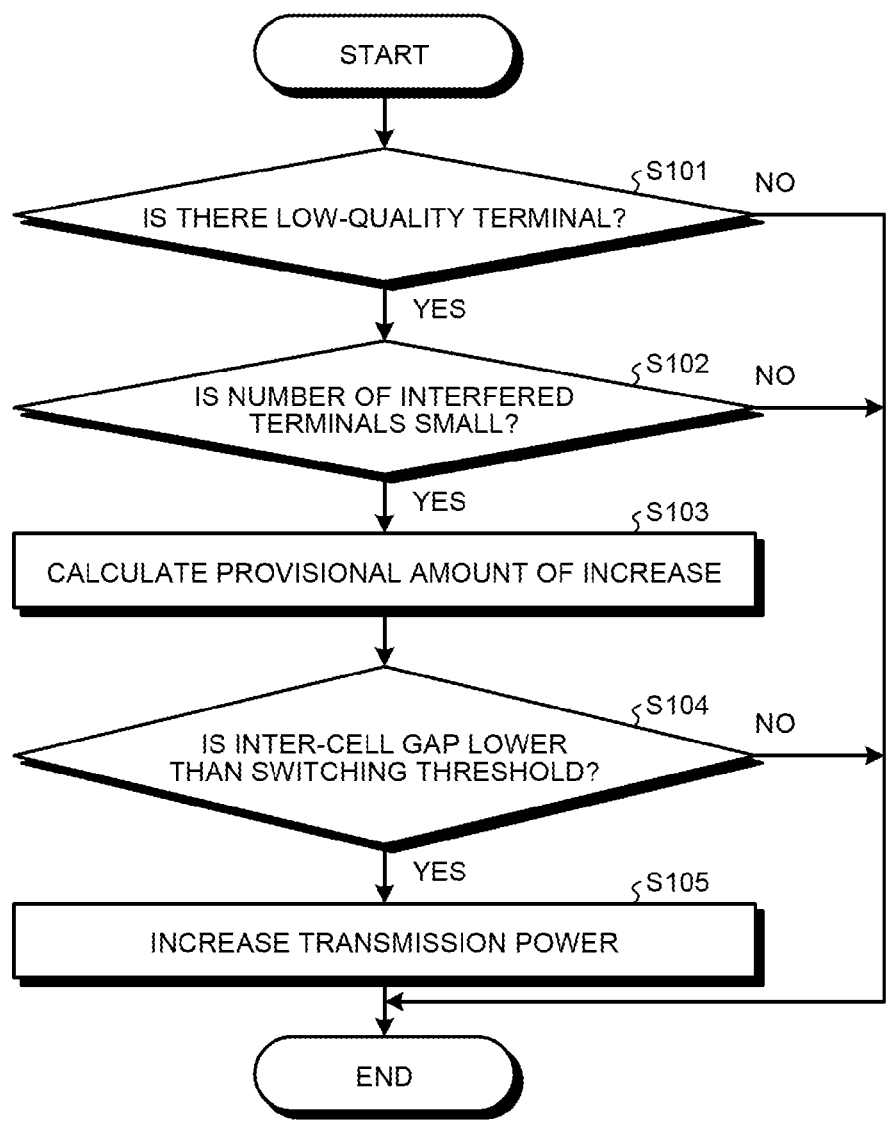
FIG. 5 is a flow diagram illustrating transmission power control processing according to the first embodiment.

Next, transmission power control in the wireless communication system configured as above will be described with reference to a flow diagram illustrated in FIG. 5. The following transmission power control processing is executed by the base station device 100.

The base station device 100 receives the control signal reporting on the reception quality of each component carrier from the respective terminal devices. This control signal is input to the control signal demodulation decoding unit 103 via the transmission/reception switching unit 101 and reception unit 102 and demodulated and decoded by the control signal demodulation decoding unit 103. Information on the reception quality for each component carrier obtained as a result of demodulation and decoding is then notified to the scheduler 106.

The reception quality for each component carrier is notified to the execution determination unit 151 in the transmission power control unit 107. The execution determination unit 151 then determines whether there is a low-quality terminal (step S101). That is, the reception quality in the respective terminal devices for each component carrier is compared with the predetermined quality threshold and it is determined whether there is a low-quality terminal reception quality which is lower than the quality threshold. When it is determined that there is no low-quality terminal (No in step S101), it is determined that increasing of transmission power is not required and the present transmission power is maintained.

On the other hand, when there is such a low-quality terminal (Yes in step S101), the execution determination unit 151 acquires the number of interfered terminals from the interfered terminal counting unit 105. That is, since the interfered terminal counting unit 105 counts, for each component carrier, the number of interfered terminals corresponding to the number of preambles addressed to other base station devices, the number of interfered terminals for the component carrier having low reception quality is acquired. The execution determination unit 151 then determines whether the acquired number of interfered terminals is lower than a predetermined number (step S102).

When it is determined that the number of interfered terminals is greater than or equal to the predetermined number (No in step S102), the present transmission power is maintained since influence of interference due to increasing of transmission power is large. On the other hand, when the number of interfered terminals is smaller than the predetermined number (Yes in step S102), the provisional increase amount decision unit 152 calculates the provisional amount of increase in transmission power based on the reception quality in the respective terminal devices (step S103).

Specifically, the provisional increase amount decision unit 152 may decide, as the provisional amount of increase, such an amount of increase in transmission power that the lowest reception quality from among reception quality in the low-quality terminals is greater than or equal to the predetermined quality threshold, or such an amount of increase in transmission power that an average reception quality in the low-quality terminals is greater than or equal to the predetermined quality threshold. The decided provisional amount of increase is notified to the switching threshold comparison unit 153.

The switching threshold comparison unit 153 then determines whether the inter-cell gap, when transmission power is increased by the provisional amount of increase, is lower than the predetermined switching threshold (step S104). That is, it is determined whether the difference in reception quality between component carriers, when transmission power of any one of the component carriers is increased by the provisional amount of increase, is lower than the switching threshold.

Figure 6:
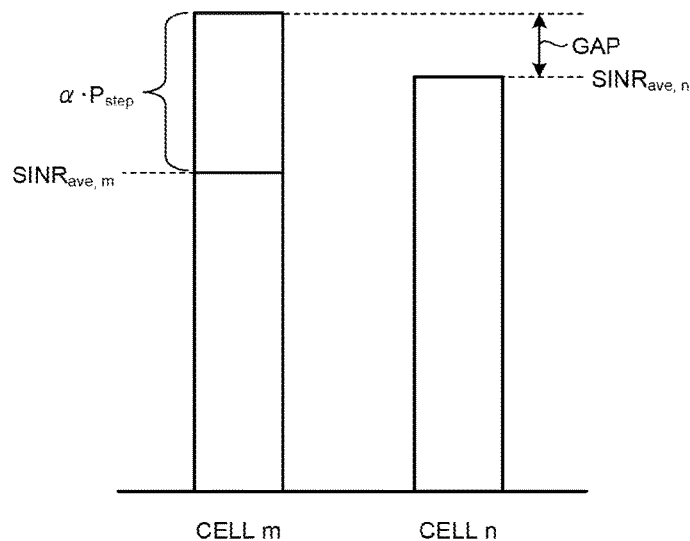
FIG. 6 is a diagram for describing an inter-cell gap according to the first embodiment.

A specific example may be a case where, as illustrated in FIG. 6, transmission power for the cell m is increased by a provisional amount of increase of $P_{step}$ where an average value of SINRs of the respective terminal devices in the cell m corresponding to the component carrier CC#m is denoted as $SINR_{ave,m}$. Here, an average value of SINRs of the respective terminal devices in the cell n corresponding to the component carrier CC#n is denoted as $SINR_{ave,n}$.

When transmission power for the cell m is increased by the provisional amount of increase $P_{step}$, the SINRs of the respective terminal devices for the component carrier CC#m is increased by a product $\alpha \times P_{step}$ where the provisional amount of increase $P_{step}$ is multiplied by a coefficient $\alpha$ corresponding a path loss between the base station device 100 and the respective terminal devices. That is, an average value of reception quality in the cell m when transmission power is increased by the provisional amount of increase $P_{step}$ is estimated as $(SINR_{ave,m} + \alpha \times P_{step})$. Furthermore, a difference between this average value of reception quality in the cell m and the average value $SINR_{ave,n}$ of reception quality in the cell n gives the inter-cell gap. When the inter-cell gap is greater than or equal to the switching threshold, processing load of the base station device 100 increases since a great number of switching P cell connection with the cell having high reception quality occurs.

When the switching threshold comparison unit 153 determines that the inter-cell gap is greater than or equal to the switching threshold (No in step S104), the present transmission power is maintained in order to suppress an increase of processing load of the base station device 100. On the other hand, when it is determined that the inter-cell gap is lower than the switching threshold (Yes in step S104), the provisional amount of increase is decided as the amount of increase in transmission power and is notified as such to the transmission power instruction unit 154. Thereafter, the transmission power instruction unit 154 instructs the transmission unit 110 about the amount of increase in transmission power, thereby increasing transmission power for the component carrier, reception quality of which is degraded in the low-quality terminal (step S105).

As a result, reception quality of the component carrier, reception quality of which is degraded, is improved in the low-quality terminal, thereby improving throughput. Furthermore, even when transmission power of the component carrier is increased, the amount of increase suppresses switching P cell connection by the terminal device and thus an increase of processing load of the base station device 100 can be suppressed.

As descried above, transmission power is actually increased in the present embodiment when the inter-cell gap is lower than the switching threshold when the provisional amount of increase of transmission power is decided and transmission power is increased by the provisional amount of increase when there is a low-quality terminal and the number of interfered terminals is small. Therefore, when influence of interference due to increasing of transmission power is large, transmission power increase is not executed. Also, even when transmission power is increased, the number of terminal devices switching P cell connection is small. As a result, switching P cell connection due to increasing of transmission power does not result in increase in processing load of the base station device, thereby suppressing a temporary increase of processing load.

[b] Second Embodiment

A characteristic point in a second embodiment is to determine whether to increase transmission power by determining a threshold for allowing switching P cell connection based on the number of terminal devices that perform P cell connection using the component carrier, transmission power of which is to be increased.

Figure 7:
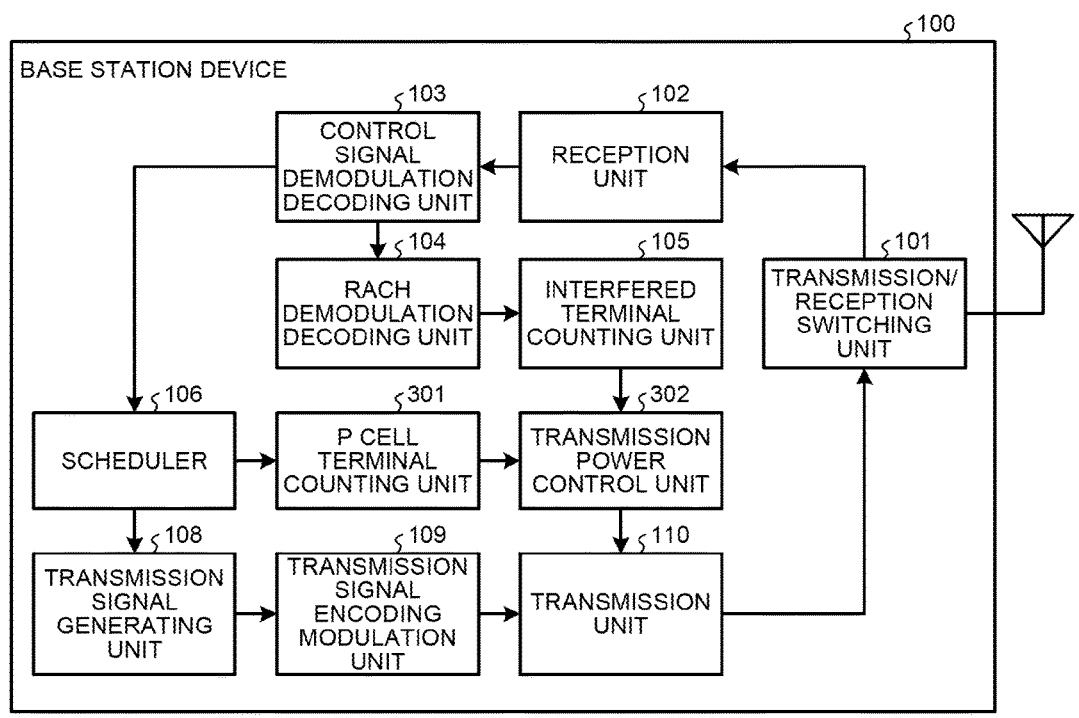
FIG. 7 is a block diagram illustrating a configuration of a base station device according to a second embodiment.

A configuration of a wireless communication system according to the second embodiment is similar to that of the first embodiment (FIG. 1) and thus description thereon is omitted. FIG. 7 is a block diagram illustrating a configuration of a base station device 100 according to the second embodiment. In FIG. 7, the same item as in FIG. 2 is denoted with the same sign and description thereon is omitted. The base station device 100 illustrated in FIG. 7 includes a P cell terminal counting unit 301 and a transmission power control unit 302 in place of the transmission power control unit 107 illustrated in FIG. 2.

The P cell terminal counting unit 301 refers to a scheduling result by the scheduler 106 and counts the number of terminal devices that perform P cell connection for each component carrier. That is, the P cell terminal counting unit 301 confirms which component carrier is used for P cell connection by the respective terminal devices and counts the number of terminal devices in P cell connection using each of the component carriers.

For example, in the example of the base station device 100*a* illustrated in FIG. 1, the terminal devices in P cell connection using the component carrier CC#m includes the terminal devices 200*a* and 200*b*. Also, the terminal device in P cell connection using the component carrier CC#n is solely the terminal device 200*c*. Therefore, the P cell terminal counting unit 301 counts the number of terminal devices in P cell connection using the component carrier CC#m as two while counting the number of terminal devices in P cell connection using the component carrier CC#n as one.

The transmission power control unit 302 controls transmission power of the base station device 100 for each component carrier. Here, the transmission power control unit 302 refers to the reception quality in the respective terminal devices and determines whether there is a low-quality terminal. When there is the low-quality terminal, the transmission power control unit 302 increases transmission power of the component carrier with low reception quality. Here, however, the transmission power control unit 302 refers to the number of interfered terminals counted by the interfered terminal counting unit 105. When the number of interfered terminals is lower than a predetermined number, the transmission power control unit 302 increases transmission power. Furthermore, the transmission power control unit 302 determines the threshold for the number of occurrence of switching P cell connection and increases transmission power when the number of terminal devices switching P cell connection is estimated to be lower than the threshold.

Figure 8:
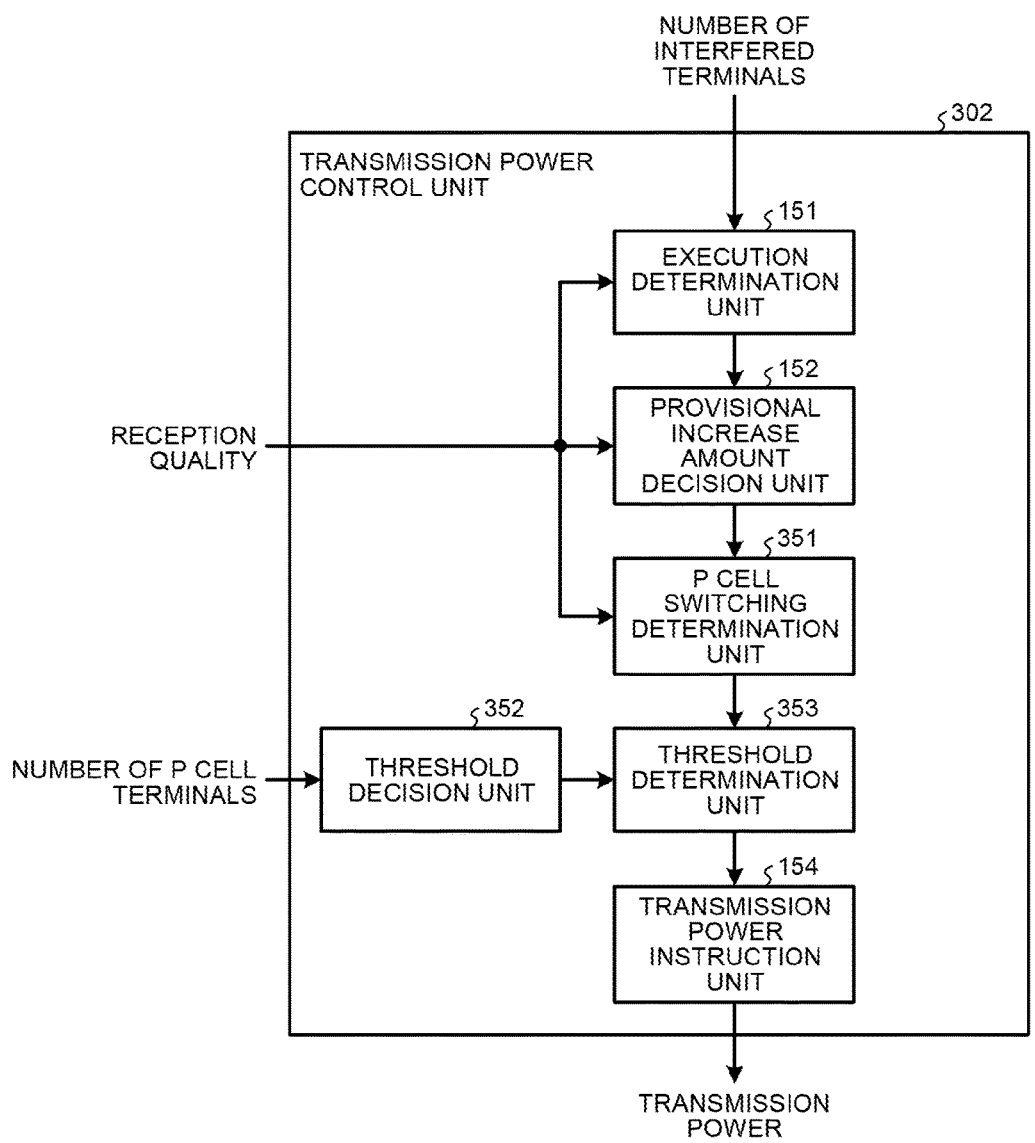
FIG. 8 is a block diagram illustrating a configuration of a transmission power control unit according to the second embodiment.

Specifically, the transmission power control unit 302 has a configuration illustrated in FIG. 8. In FIG. 8, the same item as in FIG. 3 is denoted with the same sign and description thereon is omitted. The transmission power control unit 302 illustrated in FIG. 8 includes a P cell switching determination unit 351, a threshold decision unit 352, and a threshold determination unit 353 in place of the switching threshold comparison unit 153 illustrated in FIG. 3.

The P cell switching determination unit 351 determines whether the respective terminal devices switch P cell connection when transmission power is increased by the provisional amount of increase. That is, the P cell switching determination unit 351 estimates reception quality in the respective terminal devices of the component carrier, transmission power of which is increased by the provisional amount of increase and determines whether the reception quality of the component carrier is greater than reception quality of other component carriers by the switching threshold or more. In other words, the P cell switching determination unit 351 determines whether the inter-cell gap in each terminal device becomes greater than or equal to the switching threshold after transmission power is increased. The P cell switching determination unit 351 estimates that switching P cell connection occurs in the terminal device where the inter-cell gap is greater than or equal to the switching threshold.

The threshold decision unit 352 acquires the number of terminal devices in P cell connection counted by the P cell terminal counting unit 301 for each component carrier and decides the number of terminal devices that allow switching P cell connection as the threshold. Specifically, the threshold decision unit 352 decides the threshold by subtracting, from an upper limit number of terminal devices with which the base station device 100 can allow P cell connection for the component carrier, transmission power of which is to be increased, the number of terminal devices that are currently in P cell connection. Thereafter, the threshold decision unit 352 notifies of the decided threshold to the threshold determination unit 353.

The threshold determination unit 353 determines whether the number of terminal devices, that have been estimated to switch P cell connection by the P cell switching determination unit 351, is greater than or equal to the threshold decided by the threshold decision unit 352. When the threshold determination unit 353 determines that the number of terminal devices that switch P cell connection is greater than or equal to the threshold, transmission power increase is halted. Here, the threshold determination unit 353 may, without completely halting transmission power increase, set the amount of increase in transmission power lower than the provisional amount of increase such that the number of terminal devices switching P cell connection is lower than the threshold. On the other hand, when the threshold determination unit 353 determines that the number of terminal devices switching P cell connection is lower than the threshold, the threshold determination unit 353 determines the provisional amount of increase as the amount of increase in transmission power and notifies as such to the transmission power instruction unit 154.

Figure 9:
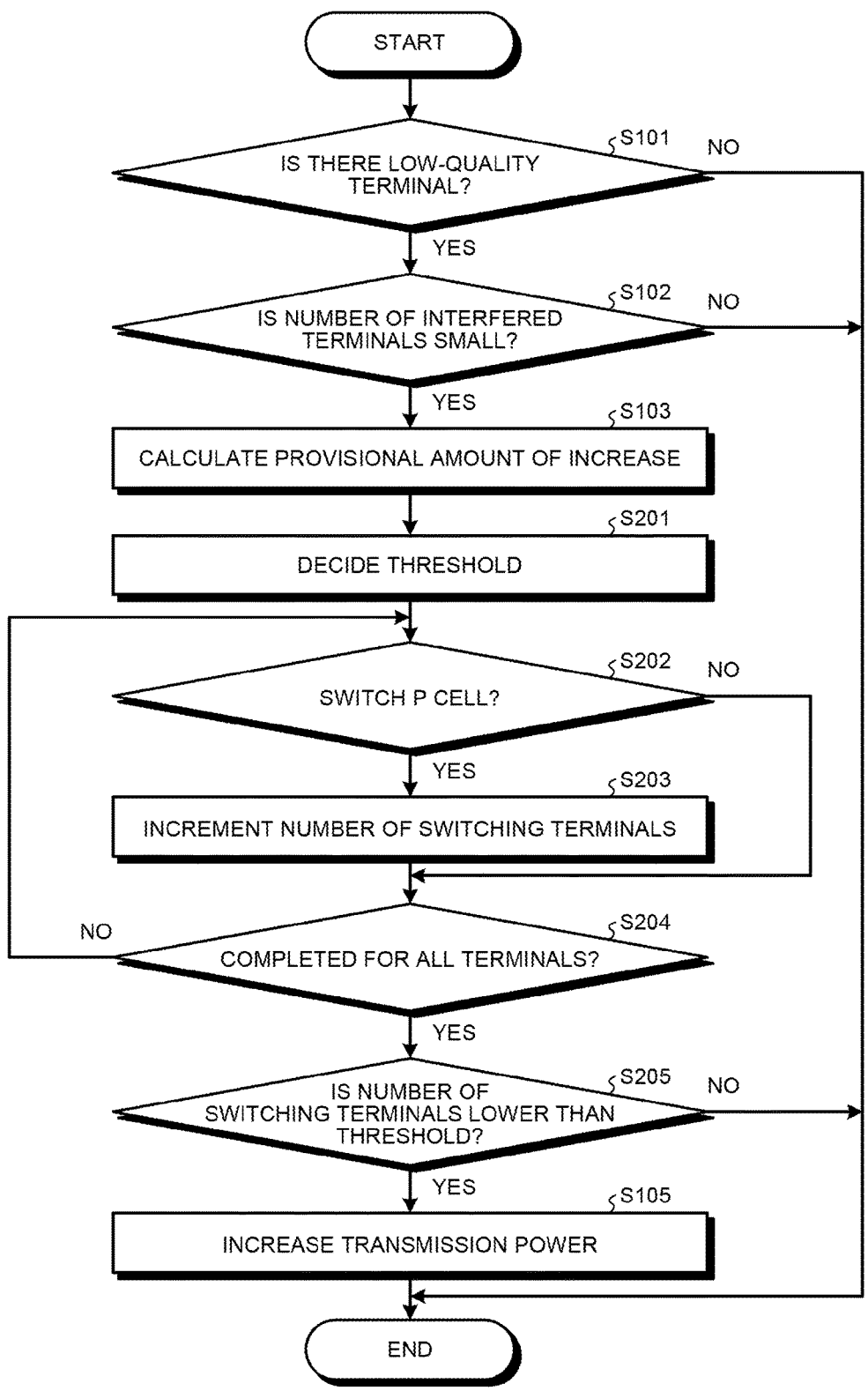
FIG. 9 is a flow diagram illustrating transmission power control processing according to the second embodiment.

Next, transmission power control by the base station device 100 configured as above will be described with reference to a flow diagram illustrated in FIG. 9. In FIG. 9, the same item as in FIG. 5 is denoted with the same sign and detailed description thereon is omitted.

Similarly to the first embodiment, reception quality information for each component carrier reported from the respective terminal devices is notified to the execution determination unit 151 in the transmission power control unit 302 via the scheduler 106. It is then determined whether there is a low-quality terminal (step S101). When it is determined that there is no low-quality terminal (No in step S101), it is determined that increasing of transmission power is not required and the present transmission power is maintained.

On the other hand, when there is such a low-quality terminal (Yes in step S101), the execution determination unit 151 acquires the number of interfered terminals from the interfered terminal counting unit 105. The execution determination unit 151 then determines whether the acquired number of interfered terminals is lower than a predetermined number (step S102).

When it is determined that the number of interfered terminals is greater than or equal to the predetermined number (No in step S102), the present transmission power is maintained since influence of interference due to increasing of transmission power is large. On the other hand, when the number of interfered terminals is smaller than the predetermined number (Yes in step S102), the provisional increase amount decision unit 152 calculates the provisional amount of increase in transmission power based on the reception quality in the respective terminal devices (step S103). The decided provisional amount of increase is notified to the P cell switching determination unit 351.

In parallel to this processing, the threshold decision unit 352 decides a threshold equal to the number of terminal devices that allow switching P cell connection (step S201). That is, when transmission power of any of the component carriers is increased, an upper limit for the number of terminal devices allowing switching P cell connection using that component carrier is decided. This upper limit threshold is obtained by subtracting, from an upper limit number of terminal devices with which the base station device 100 can allow P cell connection for the component carrier, transmission power of which is to be increased, the number of terminal devices that are currently in P cell connection. The decided threshold is notified to the threshold determination unit 353.

When the provisional amount of increase is notified to the P cell switching determination unit 351, the P cell switching determination unit 351 estimates, for each terminal device, whether switching P cell connection occurs when transmission power is increased by the provisional amount of increase (step S202). That is, it is determined, for each terminal device, whether the inter-cell gap, when transmission power of any one of the component carriers is increased by the provisional amount of increase, is lower than the switching threshold.

Figure 10:
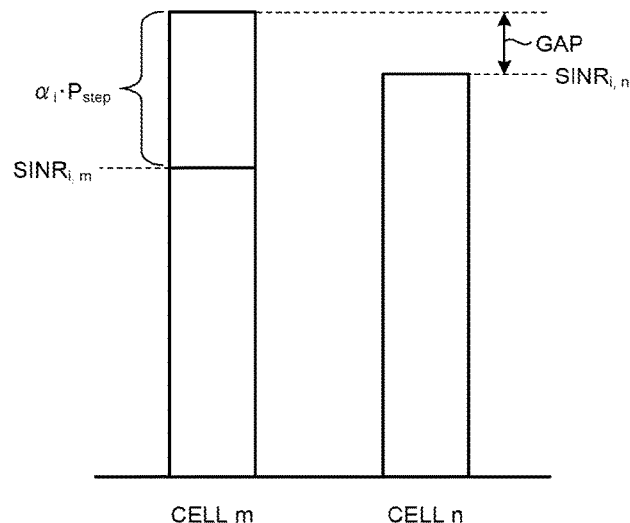
FIG. 10 is a diagram for describing an inter-cell gap according to the second embodiment.

A specific example may be a case where, as illustrated in FIG. 10, transmission power for the cell m is increased by a provisional amount of increase $P_{step}$ where SINR of a terminal device i in the cell m corresponding to the component carrier CC#m is denoted as $SINR_{i,m}$. Here, the SINR of the terminal device i in the cell n corresponding to the component carrier CC#n is denoted as $SINR_{i,n}$.

When transmission power for the cell m is increased by the provisional amount of increase $P_{step}$, the SINRs of the terminal device i for the component carrier CC#m is increased by a product $\alpha_i \times P_{step}$ where the provisional amount of increase $P_{step}$ is multiplied by a coefficient $\alpha_i$ corresponding a path loss between the base station device 100 and the terminal device i. That is, reception quality in the terminal device i in the cell m when transmission power is increased by the provisional amount of increase $P_{step}$ is estimated as $(SINR_{i,m} + \alpha_i \times P_{step})$. A difference between this reception quality in the cell m and the reception quality $SINR_{i,n}$ in the cell n gives the inter-cell gap. When the inter-cell gap is greater than or equal to the switching threshold, the terminal device i in P cell connection using the cell n switches to P cell connection using the cell m with higher reception quality.

Therefore, the P cell switching determination unit 351 sequentially selects the terminal device that is not in P cell connection using the component carrier, transmission power of which is to be increased, and determines whether increasing of transmission power results in the inter-cell gap greater than or equal to the switching threshold. When it is determined that the inter-cell gap is greater than or equal to the switching threshold in the selected terminal device (Yes in step S202), a count value of terminal devices switching P cell connection is incremented by one (step S203). On the other hand, when it is determined that the inter-cell gap is lower than the switching threshold in the selected terminal device (No in step S202), the count value is not incremented and it is determined whether the determination has been completed for all of the target terminal devices (step S204).

In this manner, estimation is repeated on whether P cell connection is switched due to transmission power increase in the terminal device that is not in P cell connection using the component carrier, transmission power of which is to be increased, thereby counting the number of terminal devices switching P cell connection. When estimation is completed for all of the target terminal devices (Yes in step S204), the threshold determination unit 353 compares the count value of the terminal devices switching P cell connection and the threshold having been decided by the threshold decision unit 352 (step S205).

When it is determined that the count value is greater than or equal to the threshold (No in step S205), the present transmission power is maintained in order to suppress an increase of processing load of the base station device 100. On the other hand, when it is determined that the count value is lower than the threshold (Yes in step S205), the provisional amount of increase is decided as the amount of increase in transmission power and notified to the transmission power instruction unit 154. Thereafter, the transmission power instruction unit 154 instructs the transmission unit 110 about the amount of increase in transmission power, thereby increasing transmission power for the component carrier, reception quality of which is degraded in the low-quality terminal (step S105).

As a result, reception quality of the component carrier, reception quality of which is degraded, is improved in the low-quality terminal, thereby improving throughput. Furthermore, even when transmission power of the component carrier is increased, the number of terminal devices in P cell connection using the component carrier does not surpass an upper limit allowed by the base station device 100 and thus an increase of processing load of the base station device 100 can be suppressed.

As descried above, transmission power is actually increased in the present embodiment when the number of terminal devices switching P cell connection is within an allowable range when the provisional amount of increase of transmission power is decided and transmission power is increased by the provisional amount of increase when there is a low-quality terminal and the number of interfered terminals is small. Therefore, when influence of interference due to transmission power increase is large, transmission power increase is not executed. Also, even when transmission power is increased, the number of terminal devices switching P cell connection does not surpass the upper limit allowed by the base station device. As a result, switching P cell connection due to increasing of transmission power does not result in increase in processing load of the base station device, thereby suppressing a temporary increase of processing load.

[c] Third Embodiment

A characteristic point in a third embodiment is to count the number of interfered terminals by counting a sounding reference signal (SRS) for uplink quality measurement transmitted by the terminal device.

Figure 11:
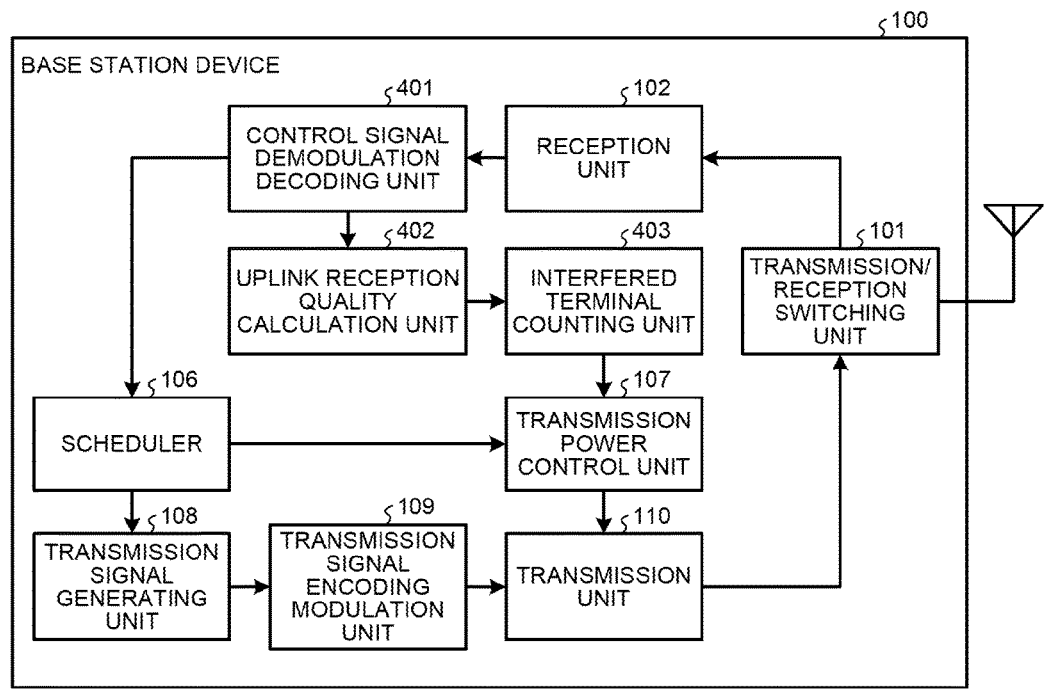
FIG. 11 is a block diagram illustrating a configuration of a base station device according to a third embodiment.

A configuration of a wireless communication system according to the third embodiment is similar to that of the first embodiment (FIG. 1) and thus description thereon is omitted. FIG. 11 is a block diagram illustrating a configuration of a base station device 100 according to the third embodiment. In FIG. 11, the same item as in FIG. 2 is denoted with the same sign and description thereon is omitted. A base station device 100 illustrated in FIG. 11 includes a control signal demodulation decoding unit 401, an uplink reception quality calculation unit 402, and an interfered terminal counting unit 403 in place of the control signal demodulation decoding unit 103, the RACH demodulation decoding unit 104, and the interfered terminal counting unit 105 illustrated in FIG. 2.

The control signal demodulation decoding unit 401 demodulates and decodes a control signal included in a reception signal and outputs, to the uplink reception quality calculation unit 402, the SRS for uplink quality measurement transmitted from the respective terminal devices. Here, the control signal demodulation decoding unit 401 outputs, to the uplink reception quality calculation unit 402, not only the SRS addressed to the base station device 100 but also the SRS addressed to other base station devices.

Furthermore, the control signal demodulation decoding unit 401 outputs, to the uplink reception quality calculation unit 402, SRS setting information informed by other base station devices. That is, the base station device informs of setting information on an SRS frequency hopping pattern or the like in order to enable SRS transmission to the own device. The base station device 100 thus periodically receives the setting information informed by other base station devices and the control signal demodulation decoding unit 401 outputs this setting information to the uplink reception quality calculation unit 402. Furthermore, the control signal demodulation decoding unit 401 notifies the scheduler 106 of information, included in the control signal, on downlink reception quality measured and reported by the respective terminal devices.

Note that the control signal demodulation decoding unit 401 does not necessarily output, to the uplink reception quality calculation unit 402, the setting information informed by other base station devices. That is, the base station device 100 does not necessarily receive the setting information informed by other base station devices.

The uplink reception quality calculation unit 402 calculates uplink reception quality using the SRS output from the control signal demodulation decoding unit 401. Specifically, the uplink reception quality calculation unit 402 calculates the uplink reception quality using the SRS transmitted to the base station device 100 from the respective terminal devices. Moreover, the uplink reception quality calculation unit 402 acquires the SRS transmitted to base station devices other than the base station device 100 based on the SRS setting information.

Note that, as described above, the SRS setting information informed by other base station devices is not necessarily received by the base station device 100. Even in such a case, since the uplink reception quality calculation unit 402 has the setting information on the SRS addressed to the base station device 100, the uplink reception quality calculation unit 402 may acquire, as the SRS addressed to other base station devices, the SRS transmitted with settings different from the above setting information.

The interfered terminal counting unit 403 counts the number of interfered terminals when transmission power from the base station device 100 is increased. Specifically, the interfered terminal counting unit 403 counts the number of SRSs transmitted to other base station devices and acquired by the uplink reception quality calculation unit 402. The terminal device, which has transmitted the SRS received by the base station device 100 even though the SRS has been addressed to another base station device, can be deemed to be located relatively close to the base station device 100. Therefore, the interfered terminal counting unit 403 counts the number of interfered terminals by counting the number of SRSs addressed to other base station devices.

In the present embodiment, the number of interfered terminals is counted not by using the preamble for RACH as in the first embodiment but by using the SRS. When the counted number of interfered terminals is greater than or equal to a predetermined number, the present transmission power is maintained since influence on interference due to transmission power increase is large. On the other hand, when the number of interfered terminals is smaller than the predetermined number, as in the first embodiment, it is determined whether the inter-cell gap, when the provisional amount of increase is decided and transmission power is increased by the provisional amount of increase, is lower than the switching threshold.

When it is determined that the inter-cell gap is greater than or equal to the switching threshold, the present transmission power is maintained in order to suppress an increase of processing load of the base station device 100. On the other hand, when it is determined that the inter-cell gap is lower than the switching threshold, the provisional amount of increase is decided as the amount of increase in transmission power and transmission power is increased.

As a result, reception quality is improved in the low-quality terminal, thereby improving throughput. Furthermore, even when transmission power is increased, the amount of increase suppresses switching P cell connection by the terminal devices and thus an increase of processing load of the base station device 100 can be suppressed.

As described above, in the present embodiment, the number of interfered terminals is counted using the SRS for uplink quality measurement. Moreover, transmission power is actually increased when the inter-cell gap is lower than the switching threshold when the provisional amount of increase of transmission power is decided and transmission power is increased by the provisional amount of increase when there is a low-quality terminal and the number of interfered terminals is small. Therefore, when influence of interference due to increasing of transmission power is large, transmission power increase is not executed. Also, even when transmission power is increased, the number of terminal devices switching P cell connection is small. As a result, switching P cell connection due to increasing of transmission power does not result in increase in processing load of the base station device, thereby suppressing a temporary increase of processing load.

Note that the aforementioned embodiments may be combined as appropriate upon implementation. That is, for example, the second embodiment and third embodiment may be combined where the number of interfered terminals may be counted by using the SRS and, when the number of interfered terminals is smaller than a predetermined number, it may be determined whether the number of terminal devices switching P cell connection is smaller than a threshold before increasing transmission power.

Figure 12:
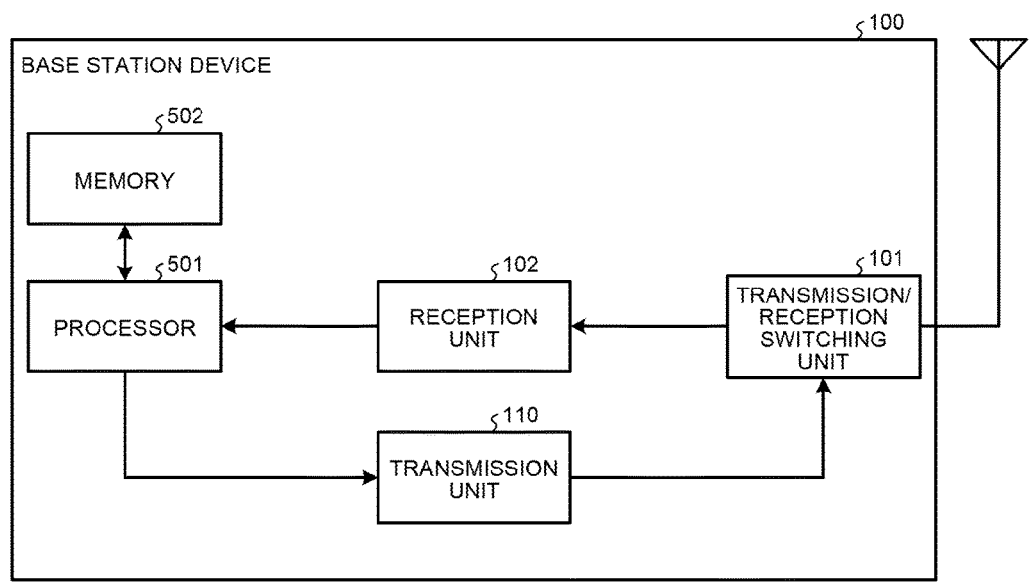
FIG. 12 is a block diagram illustrating an exemplary hardware configuration of the base station device.

Furthermore, the base station device 100 in each of the aforementioned embodiments has, for example, a hardware configuration as illustrated in FIG. 12. In FIG. 12, the same item as in FIG. 2 is denoted with the same sign. As illustrated in FIG. 12, the base station device 100 includes the transmission/reception switching unit 101, the reception unit 102, the transmission unit 110 as well as a processor 501 and a memory 502.

The processor 501 executes the transmission power control in each of the aforementioned embodiments while using the memory 502 that stores various data or the like. Therefore, the processor 501 executes processing corresponding to each of the processing units other than, for example, the transmission/reception switching unit 101, the reception unit 102, and the transmission unit 110 in FIGS. 2, 7, and 11. The processor 501 may be, for example, one or more of a central processing unit (CPU), a micro processing unit (MPU), a digital signal processor (DSP), and a field programmable gate array (FPGA).

Moreover, the transmission power control processing in each of the aforementioned embodiments may be written as a program executable on a computer. In this case, the program may be stored in a computer-readable storage medium to allow implementation on a computer. The computer-readable storage medium may be a portable storage medium such as a CD-ROM, DVD disc, or USB memory or a semiconductor memory such as a flash memory.

An embodiment of the wireless communication system, the base station device, and the transmission power control method disclosed herein can achieve an advantageous effect of suppressing a temporary increase of processing load.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system in which a base station device and a terminal device communicate wirelessly using a plurality of carriers having different frequency bands,
wherein the terminal device comprises:
a calculation unit that calculates reception quality of each of the plurality of carriers; and
a transmission/reception unit that performs primary cell connection for transmission and reception of a control channel signal with the base station device using a carrier whose reception quality calculated by the calculation unit is most preferable, and
the base station device comprises:
a counting unit that counts, for each of the carriers, a number of terminal devices wirelessly communicating with another base station device using a carrier having a frequency band same as a frequency band of each of the plurality of carriers;
a terminal device number determination unit that refers to the number of terminal devices counted by the counting unit and determines whether the number of terminal devices wirelessly communicating with another base station device using a carrier having a frequency band same as a frequency band of a first carrier is smaller than a predetermined number, reception quality of the first carrier calculated by the calculation unit being smaller than a predetermined quality threshold;
a decision unit that decides an amount of increase in transmission power of the first carrier based on the reception quality calculated by the calculation unit, when the terminal device number determination unit determines that the number of terminal devices is smaller than the predetermined number;
a determination unit that estimates whether switching of the primary cell connection by the terminal device is caused by increasing the transmission power by the amount of increase decided by the decision unit and determines whether to increase the transmission power according to the estimation result; and
an instruction unit that instructs a transmission unit to increase the transmission power of the carrier by the amount of increase when the determination unit determines to increase the transmission power.

2. The wireless communication system according to claim 1,
wherein the determination unit estimates reception quality of the first carrier in case of increasing transmission power of the first carrier by the amount of increase decided by the decision unit, estimates that the switching of the primary cell connection is caused by the increasing of the transmission power when a difference between the estimated reception quality of the first carrier and reception quality of a second carrier different from the first carrier is greater than or equal to a predetermined switching threshold, and determines to halt increasing of the transmission power.

3. The wireless communication system according to claim 1,
   wherein the determination unit estimates, for each terminal device, reception quality of the first carrier in case of increasing transmission power of the first carrier by the amount of increase decided by the decision unit, estimates that the switching of the primary cell connection is caused by the increasing of the transmission power in a terminal device where a difference between the estimated reception quality of the first carrier and reception quality of a second carrier currently in use for the primary cell connection is greater than or equal to a predetermined switching threshold, and determines to halt increasing of the transmission power when a number of terminal devices in which the switching of the primary cell connection is estimated to be caused is greater than or equal to a threshold.

4. The wireless communication system according to claim 3,
   wherein the base station device further comprises a primary cell connection counting unit that counts, for each of the carriers, a number of terminal devices that perform the primary cell connection using each of the plurality of carriers, and
   the determination unit determines the threshold to be compared with the number of terminal devices in which the switching of the primary cell connection is estimated to be caused, based on the number of terminal devices counted by the primary cell connection counting unit.

5. The wireless communication system according to claim 1,
   wherein the counting unit counts the number of terminal devices wirelessly communicating with another base station device by counting a number of preambles for random access transmitted by the terminal device.

6. The wireless communication system according to claim 1,
   wherein the counting unit counts the number of terminal devices wirelessly communicating with another base station device by counting a reference signal for uplink quality measurement transmitted by the terminal device.

7. A base station device, comprising:
   an acquisition unit that acquires reception quality of each of a plurality of carriers from a terminal device that performs primary cell connection for transmission and reception of a control channel signal using a carrier whose reception quality is most preferable from among the plurality of carriers;
   a counting unit that counts, for each of the carriers, a number of terminal devices wirelessly communicating with another base station device using a carrier having a frequency band same as a frequency band of each of the plurality of carriers;
   a terminal device number determination unit that refers to the number of terminal devices counted by the counting unit and determines whether the number of terminal devices wirelessly communicating with another base station device using a carrier having a frequency band same as a frequency band of a first carrier is smaller than a predetermined number, reception quality of the first carrier being smaller than a predetermined quality threshold;
   a decision unit that decides an amount of increase in transmission power of the first carrier based on the reception quality acquired by the acquisition unit, when the terminal device number determination unit determines that the number of terminal devices is smaller than the predetermined number;
   a determination unit that estimates whether switching of the primary cell connection by the terminal device is caused by increasing the transmission power by the amount of increase decided by the decision unit and determines whether to increase the transmission power according to the estimation result; and
   an instruction unit that instructs a transmission unit to increase the transmission power of the carrier by the amount of increase when the determination unit determines to increase the transmission power.

8. A transmission power control method comprising:
   acquiring reception quality of each of a plurality of carriers from a terminal device that performs primary cell connection for transmission and reception of a control channel signal using a carrier whose reception quality is most preferable from among the plurality of carriers;
   counting, for each of the carriers, a number of terminal devices wirelessly communicating with another base station device using a carrier having a frequency band same as a frequency band of each of the plurality of carriers;
   referring to the number of terminal devices counted and determining whether the number of terminal devices wirelessly communicating with another base station device using a carrier having a frequency band same as a frequency band of a first carrier is smaller than a predetermined number, reception quality of the first carrier being smaller than a predetermined quality threshold;
   deciding an amount of increase in transmission power of the first carrier based on the reception quality acquired at the acquiring, when the number of terminal devices is determined to be smaller than the predetermined number;
   estimating whether switching of the primary cell connection by the terminal device is caused by increasing the transmission power by the amount of increase decided at the deciding;
   determining whether to increase the transmission power according to the estimation result at the estimating; and
   instructing a transmission unit to increase the transmission power of the carrier by the amount of increase when it is determined to increase the transmission power.

* * * * *